Oct. 7, 1958 G. SAVARD ET AL 2,855,293
METHOD AND APPARATUS FOR TREATING MOLTEN METAL WITH OXYGEN
Filed March 21, 1955 2 Sheets-Sheet 1
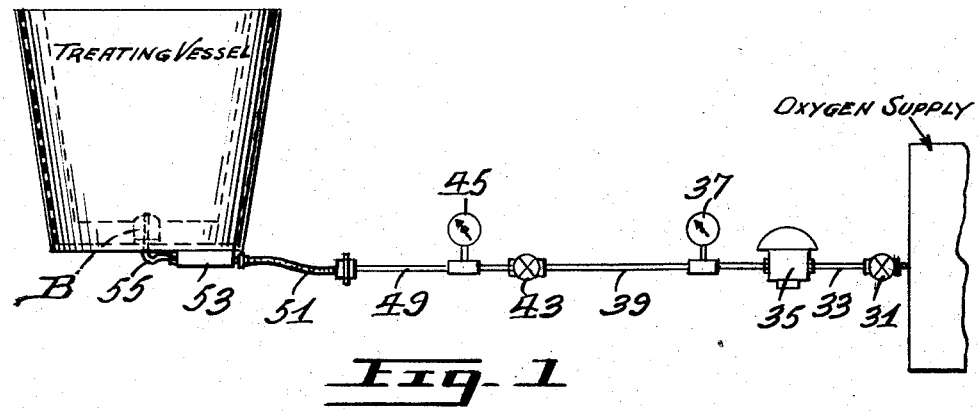
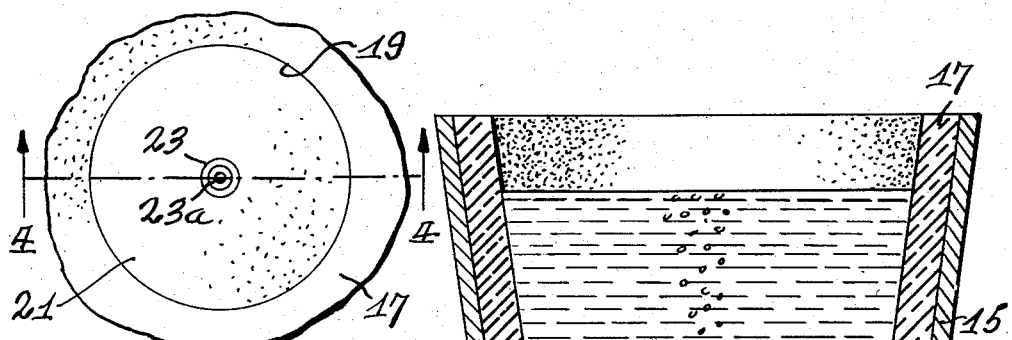
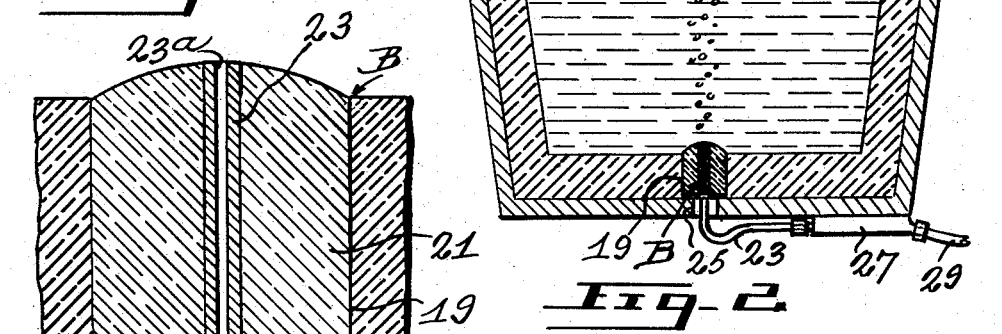
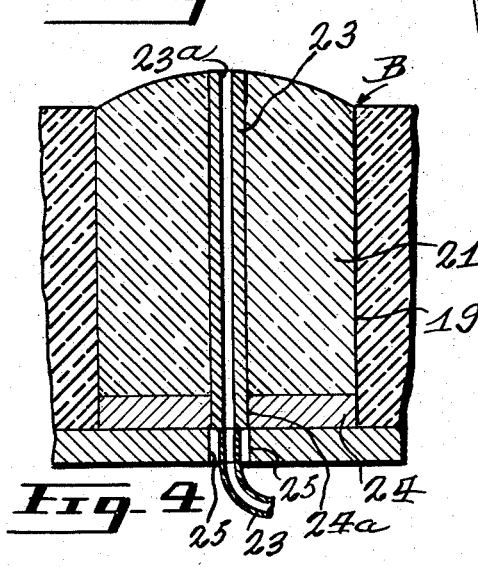
Inventors
GUY SAVARD
ROBERT LEE
By Alan Swabey
Attorney Oct. 7, 1958     G. SAVARD ET AL     2,855,293
METHOD AND APPARATUS FOR TREATING MOLTEN METAL WITH OXYGEN
Filed March 21, 1955     2 Sheets-Sheet 2

Inventors
GUY SAVARD
ROBERT LEE
By Alan Swabey
Attorneys

United States Patent Office 2,855,293
Patented Oct. 7, 1958

2,855,293

METHOD AND APPARATUS FOR TREATING MOLTEN METAL WITH OXYGEN

Guy Savard, Vaudreuil, Quebec, and Robert Lee, Montreal, Quebec, Canada, assignors to L'Air Liquide, Societe Anonyme pour l'Etude et l'Exploitation des Procedes Georges Claude Application March 21, 1955, Serial No. 495,736

16 Claims. (Cl. 75—60)

This invention relates to a method of high pressure oxygen gas injection to treat molten metal, particularly iron, steel, stainless steel and zinc.

PRIOR ART

The technology on the use of oxygen gas for treating metals, for example, refining iron either partially or completely, has advanced rapidly since the appearance of low cost bulk oxygen. Oxygen gas has been injected into hot iron through a lance to lower the silicon content, prior to addition to Thomas converters or open hearth furnaces. The lance is inserted into the molten mass from the surface. Pressures up to 200 pounds per square inch are employed. With the oxygen gas flowing through the metal, a vigorous reaction is created and the lance is eroded rapidly and is continually burning off. The elimination of silicon is also accompanied by evolution of dense clouds of red oxide fumes.

In another refining process using oxygen gas the gas is injected into the iron through a water-cooled copper lance placed eighteen to twenty-four inches above the surface of the metal (such lances are not placed in contact with the metal). Oxygen gas pressures up to 250 pounds per square inch are employed. The treatment takes place in a solid bottom converter-shaped vessel. The iron in this process is converted directly to steel without duplexing. As with surface lancing to eliminate silicon, this surface blowing process produces a tremendous amount of undesirable red iron oxide fumes.

One of the main disadvantages of these two types of process is the generation of the red fumes, which are most undesirable because they pollute the atmosphere and dirty the inhabited areas for some distance from the plant. The iron oxide dust particles in the atmosphere can be the source of much inconvenience, so, in most localities, the fumes must be recovered to prevent air pollution. Aside from this, the formation of iron oxide fumes means a loss of iron and a loss of oxygen gas.

Many basic converters employ oxygen-enriched air for blowing the metal. Because higher oxygen content in the blast results in erosion of tuyeres and in excessive iron oxide fume formation, the optimum enrichment practical is from 35 to 40% oxygen content. To overcome these drawbacks, oxygen gas is sometimes diluted with either carbon dioxide or steam. The heat extracted by the carbon dioxide or steam reduces considerably the thermal efficiency of the process.

In another attempt to overcome the above mentioned problems, oxygen is injected from an aperture formed in the tuyere member of high heat conductivity. Heat is removed from the member by a water cooling arrangement at such a high rate that a layer of "frozen" or solidified metal is said to be deposited on the member to protect it. This arrangement has the disadvantage of being cumbersome and involves the risk of explosion by failure of a wall of the containing vessel allowing molten metal and water to come into contact.

APPLICANTS' DEVELOPMENT

The present invention overcomes disadvantages of the prior art and provides for a practical process of treating molten metal in which concentrated oxygen is injected below the surface of the metal through the shell and refractory lining of a containing vessel. The process is carried out without special complicated apparatus for cooling or complications in the process itself as for example premature disintegration of the vessel or of vital parts. According to the invention, the concentrated oxygen is issued in the form of a jet clothed by a conductive issuing medium forming part of an injector member, for a time and at a temperature which would normally be expected to disintegrate the issuing medium. With the invention, however, the injection being in the form of an isolated small cross section high velocity jet or jets at a pressure above about 400 pounds per square inch and preferably from about 400 to about 1,000 pounds per square inch, is effective in producing a localized protective cooling effect which eliminates or reduces the erosion of the injector to the point where its integrity is maintained long enough to carry out complete metallurgical operations and in certain instances to maintain the integrity of the injector for several operations and in some cases up to the life of the normal refractory lining of the vessel.

Intimate contact between the gas and the molten metal is derived through the use of the high pressure combined with the small cross-section of the injected stream or streams. Where several jets are used, they are isolated from one another, preferably being spaced with one jet not less than about 9 inches, preferably about 12 inches or more from other jets.

In the case of treating molten iron for example, temperatures of between about 2200° F. and 3200° F. are encountered. It would be expected that an injector tube without special cooling arrangements would burn off too fast to make practical oxygen injection for long enough to obtain any treating effect. Each heat to produce metallurgical effects, for instance, requires 20 to 40 minutes more or less or say 10 to 60 minutes to complete. With the applicants' process, the burn-off or erosion rate of the injector member is slow enough that a heat can be carried out, and in many cases several heats can be carried out, before the injector member loses its integrity.

In accordance with the invention, the cross-sectional area of the injected stream of oxygen should be within the range from about 0.003 square inch to about 0.03 square inch. The medium issuing the injected stream at the injection zone should have a combination of high heat conductivity with a high melting point and a high resistance to oxidation. It is also desirable that the injected stream be clothed by a conductive wall of the issuing medium in the vicinity of the injection zone effectively thick to dissipate heat from the zone at a high rate. In the case of copper, which is a preferred issuing medium, the prescribed thickness is not less than about $3/16$ of an inch. The wall may be thicker say up to about 1 inch with up to about $1/2$ inch preferred. The range of thickness for copper is also operative for stainless steel.

The injector is surrounded by refractory preferably at least up to its tip. Should the injector tube inject beyond the normal refractory level of the refractory lining of the vessel, a mound or "beehive" of refractory is built up to surround the injector tube so that preferably only the end of its tip is exposed to the molten metal. Where the vessel is a small one, say a 500 pound ladle which would have a refractory lining from about 2 to 2½ inches thick, the injector tube preferably projects 6 to 10 inches beyond the normal surface of the refractory lining and the refractory mound is built up to protect it. With larger vessels, say a 40 ton ladle, the injector tube need not project beyond the normal refractory lining, which may itself be 10 to 12 inches thick.

A vessel suitable for carrying out the process, includes the following features. It has a metal shell and is provided with a refractory-lined cavity for containing the molten metal. A tube or conduit for conveying oxygen passes through the wall of the vessel, for example, through the bottom or side and through the refractory at a level below the normal level of the molten metal. This tube or conduit may be of a conductive metal, for example, copper or copper alloys or stainless steel, or other material effectively resistant to high temperatures. In accordance with the invention, the injector has a cross-sectional area effective to form a small high velocity jet provided with oxygen at pressures within the range from about 400 to about 1,000 pounds per square inch. Where the tube is made of copper or of a metal having a similar conductivity, the cross sectional area of the oxygen duct is within the range from about .003 square inch and about 0.03 square inch and has a wall thickness within the range from about 3/16 of an inch to about 1 inch, preferably less than about 1/2 an inch. The oxygen injector tube may be flush or below the refractory lining of the vessel and in the case of large vessels having a relatively thick lining, this is so. In the case of smaller vessels where the lining is not so thick, the injector tube may project beyond the normal level of the refractory lining and in this case it is preferably provided with a mound or "beehive" of refractory material built up beside it to protect it from the high temperatures. Where several injectors are employed, they are spaced at not less than 9 inch centres, preferably not less than 12 inch centres.

In accordance with the invention, the oxygen duct is connected to a source of high pressure oxygen. Preferably this is through a communicating means provided with two step pressure control, e. g. a pressure controller to regulate the pressure at higher pressures than those required at the injector and a pressure regulator between the pressure controller and the injector for adjusting the pressure to the desired range within about 400 to about 1,000 pounds per square inch.

The invention has generally been described. Now further preferred embodiments of it will be referred to in more detail, by reference to the accompanying drawings, in which:

Figure 1 is a schematic drawing showing a typical system in accordance with the invention, from the oxygen gas supply to the treating vessel.

Figure 2 is a cross-section through a ladle equipped in accordance with a preferred form of the present invention for carrying out the process of the present invention.

Figure 3 is a fragmentary plan view looking down on the bottom of the vessel shown in Figure 2.

Figure 4 is a vertical cross-section along the line 4—4 of Figure 3.

Figure 6:
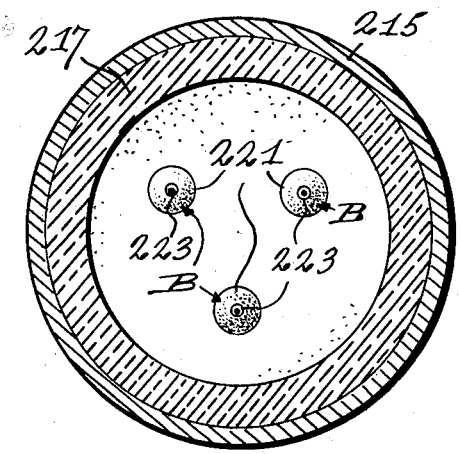
Figure 6 is a plan view illustrating the distribution of several, in this case three injectors entering the bottom of the vessel.

Referring to Figure 2, the vessel A is a standard ladle having a steel shell 15 and a refractory (fireclay) lining 17. A pocket 19 is left in the bottom ladle lining to receive an injector assembly B. The pocket including the injector assembly B is rammed with refractory 21 to fill up any gaps around the injector tube 23. The tube 23 emerges from the ladle through an opening 25 in the shell 15 and is connected to a steel ladle block 27 which conveys the high pressure oxygen gas to the injector. The block 27 is connected by a tube 29 to a source of oxygen under pressure. According to the invention, the oxygen gas is injected into the molten iron under a relatively high pressure, for example, between 400 and 1,000 pounds per square inch. The thermodynamic property of the expanding oxygen gas is employed to cool the injector tube 25, thus helping to reduce its rate of erosion. The high velocity of the expanded oxygen gas through the tube also adds greatly to the cooling effect. These two factors make it possible to eliminate external cooling.

Regardless of the specific material used for the injector tube and, regardless of the refractory material used for ramming around the injector tube, using oxygen gas at a high pressure and consequent high velocity, increases the life of the injector making possible the completion of treatment.

The tube 23 is shown in the preferred form connected to a base plate 24 resting against the bottom of the ladle. The plate 24 is recessed at 24a to receive the tube 23. An extension 23a of the tube 23 is provided, in the nature of a thinner piece of tubing which extends to the block 27. The tube 23 is welded to the plate 24. The thick part of the tube 23 is welded or otherwise firmly connected to the part 23a.

Figure 5:
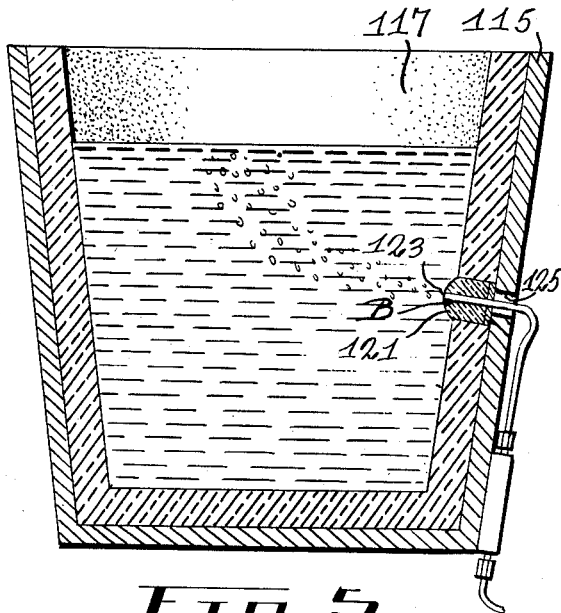
Figure 5 shows an alternate arrangement in which the injector enters the side instead of the bottom of the vessel below the normal level of the molten metal.
Figure 7:
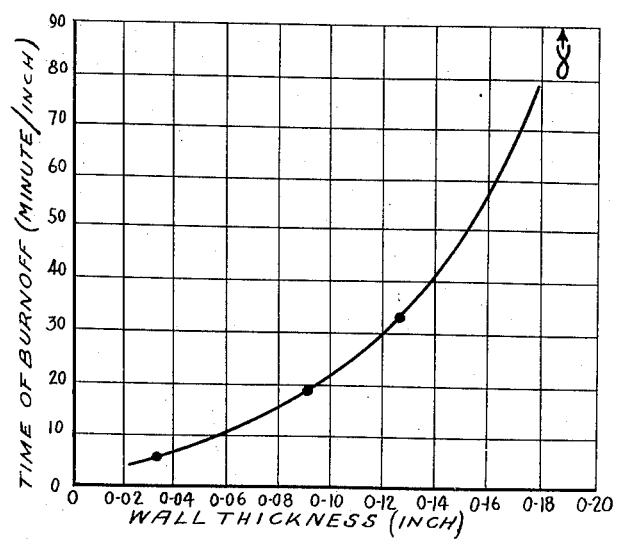
Figure 7 is a graph showing a typical relationship of wall thickness of the injector to time of burn off.

As made clear, injector jets may enter the vessel through the bottom or the side. One example of bottom injection is shown in Figure 2. One example of side injection is shown in Figure 5. There may be several tubes. An example of three tubes preferably distributed equidistant from each other and equidistant from the wall is shown in Figure 6.

In the prior art surface blowing process, the depth of the molten bath is limited and must necessarily be much less than the diameter of the container. If this characteristic relation is not adhered to in surface blowing or the depth becomes too great, the metal has a tendency to slop and sometimes the slopping becomes so intense that eruptions take place. This is caused by the tremendous gradient set up thermally and chemically between the iron at the top surface and at the bottom of the bath.

On the other hand, the treatment of iron with the applicants' submerged high pressure oxygen injection results in better efficiency and performance with a deeper bath, thus permitting more metal to be treated per batch for a vessel of a definite diameter.

The invention enables the oxidation of oxidizable metalloids in iron and other metals, therefore for example the conversion of iron to steel in standard equipment, for example, in ladles. This eliminates special costly capital equipment which is usually necessary for such treatment and for controlling fumes.

Figure 1 shows a schematic drawing of a typical system from the oxygen gas supply to the treating vessel. The high pressure oxygen is turned on and off by a high pressure valve 31. The valve 31 is connected by high pressure copper piping 33 to a high flow-high pressure regulator 35. The pressure on the downstream side of 35 is generally regulated at 800 to 1,000 pounds per square inch, which is indicated on gauge 37. The latter is connected by extra heavy seamless steel pipe 39. The pressure gauge 37 leads to a tapered seat high pressure globe valve 43, which permits the oxygen pressure to be controlled at any desirable level and which permits pressure alteration by simply turning the valve handle. This pressure on the downstream side of valve 43 shown on gauge 45 is substantially the pressure at the inlet of injector tubing 55. The gas is conveyed by pipe 49 to a suitable length of armoured flexible hose 51, which permits the treating vessel to be moved around a reasonable radius for pouring the metal after treatment. The gas from 51 enters the ladle block 53 which, in turn, conveys the gas to the injector tubing 55.

Figure 5 shows an alternative arrangement in which the injector enters the side of the treating vessel. The equipment employed is similar to that shown in the apparatus of Figures 2 to 4, so the numbers applied to the various parts are the same as Figures 2 to 4 but raised by a hundred. The vessel has been identified as AA.

The operation of this form of apparatus is similar to the operation of the apparatus of Figures 2 to 4. The advantage of this arrangement is that the depth below the surface at which the oxygen is injected may vary.

The invention will be understood in further detail by reference to the accompanying example illustrating a typical heat. This example is to be taken as illustrative only, and not necessarily as limiting the scope of the invention.

*Example*

A 60-ton conventional-type ladle was used. The pockets through which the injectors passed were rammed with the same type of refractory as that lining the vessel. 40 tons of molten iron were being blown. The three-injector type of apparatus as shown in Figure 6 was employed. The injectors had a circular bore of approximately 1/16 to 1/8 inch in diameter. The injectors projected about 1 inch above the refracotry lining.

Molten iron was deposited in the ladle to a level about 5 feet above the injector tips.

A little nitrogen was blown at the beginning to keep the injector holes open until all the metal had been poured into the vessel. Then the oxygen was turned on. Substantially pure oxygen was employed. The refractory lining of the vessel was standard acid firebrick.

15 tons of iron, per batch, were treated by the applicants' high pressure submerged oxygen injection process, as described above. The batches were processed with an iron of about 1½% carbon and with very small amounts of silicon, manganese, phosphorus and sulphur.

The oxygen pressure varied between about 400 and 1,000 pounds. The flow rate was about 25 cubic feet per ton, per minute. The injector pipe had a circular bore of one-eighth inch inside diameter and had an outside diameter of one half inch. Three injectors were used. They were symmetrically disposed in the bottom of the ladle equidistant from the wall to the centre.

The top of the metal, when injection was taking place, looked something like a group of inverted cow's udders.

Typical carbon analyses, before and after treatment, are shown in Table I.

TABLE I

| Test | Carbon Content | | (Percent) Difference |
|---|---|---|---|
| | Before | After | |
| A | 1.50 | 0.09 | 1.41 |
| B | 1.45 | 0.07 | 1.38 |

Since the silicon, manganese and phosphorus contents were low at the start, these were not analyzed.

The oxygen gas consumption is shown in Table II

TABLE II

| Test | Oxygen consumption | |
|---|---|---|
| | C. F./ton | C. F./pt. Carbon Ton |
| A | 524 | 3.7 |
| B | 590 | 4.3 |

Based on the reaction $$C + O \ldots CO$$

the efficiency of the process is as shown in Table III

TABLE III

| Test | Efficiency (Percent) Based on 3.20 cu. ft. O₂/Pt. Ton=100% |
|---|---|
| A | 86.5 |
| B | 74.4 |

(End of example.)

IRON TREATMENT

The gas comes into contact with the molten iron at the bottom of the bath. The iron oxide which is instantaneously formed must travel throughout the whole depth of the molten bath before leaving the surface of the bath.

The bath acts as a "scrubber" to react with the iron oxide, thus forming other oxides, such as with carbon, silicon, manganese and/or phosphorus. This cleaning action, as the reactants and products of reaction travel through the bath, reduces the amount of iron oxide fumes generated.

By the applicants' method, it is possible to substantially reduce the amount of red fumes evolved from the bath during oxygen treatment of iron. The surface blowing and surface lancing operations result in ebullition of red iron oxide fumes, which decrease the efficiency of the process and add substantially to the cost of the process by necessitating elaborate fume collection and equipment.

EXOTHERMIC REACTIONS

The process of the invention also makes it possible to recover more heat from exothermic reactions. In the surface blowing and surface lancing practices, the reaction takes place at or near the surface of the bath. This results in a high concentration of heat at the surface of the molten metal. In the applicants' high pressure bottom injection method, the reaction takes place throughout the depth of the whole bath, thus resulting in a greater portion of heat being absorbed by the metallic bath as compared to the surface blowing and lancing processes. This enables the charging of more steel scrap to control the bath temperature under similar conditions. These are all added desirable features. The invention permits treatment of a greater depth of metal than with other processes. In the surface blowing operation, the depth of the molten bath is limited and must necessarily be much less than the diameter of the container.

It will also be seen that the erosion of the oxygen injector is controlled by the use of high pressure and high velocity oxygen. Further, the use of any cooling equipment, for example, the use of a water-cooling system may be avoided.

METALS TREATED

The treatment of molten iron has been described by way of example, since this treatment involves a special problem which is admirably overcome by the invention. However, other metals which may be treated according to the invention are any molten metal from which it is desirable to remove a constituent, or into which it is desirable to put extra heat. Examples of such metals are iron, steel, stainless steel, and zinc in the form of slag.

CHARACTERISTICS OF OXYGEN STREAM

The oxygen may be fed at a pressure of from about 400 to about 1,000 pounds per square inch, or more. Higher pressures can be employed, but special equipment becomes necessary. Theoretically, there is actually no upper limit.

OXYGEN AMOUNT

The amount of oxygen injected is a function of the degree of oxidation and the rate at which oxidation takes place. This can be worked out by stoichiometric calculations corrected by an efficiency factor.

OXYGEN

The oxygen employed is concentrated oxygen having a purity of at least 95%. Preferably high purity oxygen of 98% or better is used. Low purities are to be avoided because of the possibility of nitrogen pick-up and slopping. Prior art processes, for example, the Bessemer process, has a limitation of about 40% oxygen concentration in the air blast; above this figure, erosion of the tyeres is excessive.

PROCESS CONDITIONS

In starting the process, a little nitrogen is blown in at the beginning. This is to keep the injector's holes open until all the metal is poured into the vessel, at which time the oxygen is turned on. Any other inert gas can be used.

The refractory lining does not enter into the reaction.

STAGE OF TREATMENT

Preferably, the treatment is carried out at the refining stage. On the other hand, the process may be used to speed up the heating of molten metal, for example, by the addition of exothermic products say, silicon or aluminum.

RED IRON OXIDE

The present invention serves to keep the red iron oxide at a level below that of corresponding processes where fume control equipment is required to conform to municipal ordinances.

INJECTOR APPARATUS

The material from which the injector is made should have a high conductivity, a high melting temperature, and good resistance to oxidation. Certain metals satisfy these requirements. Copper and copper alloys are preferred. Copper has a conductivity of 225 B. t. u. per hour per square foot of surface area per degree Fahrenheit differential in temperature per foot of thickness. Copper has a melting point of 1981° F.

Other suitable metals are nickel (conductivity 34, melting point 2646° F.), stainless steel (conductivity 9, melting point 2584° F.) and molybdenum (conductivity 85, melting point 4750° F.). All the figures given for conductivity are on the standard stated for copper. All these metals have relatively high resistance to oxidation. Other metals fulfilling the desired characteristics of high conductivity, high melting point and resistance to oxidation could be employed.

Other materials may be employed, for example, refractory materials having the desired characteristics. The high pressure oxygen injection exerts a cooling effective to maintain the integrity of these other materials unexpectedly having regard to the temperature and time of treatment.

The cross-section area of the injector bore may range from about 0.003 of a square inch inside diameter to about 0.3 square inch. The preferred range is from about .003 to .01 square inch.

The wall thickness of the injector tube has been found to be critical in respect to burn-off. To give a typical example, a graph (Figure 6) is provided showing the burn off time for a typical copper tubing used as an injector. The indicated wall thickness in inches and the time of burn off in inches per minute. The inside diameter of the injector tubing used was one-sixteenth of an inch. The oxygen pressure was within the range from about 400 to about 600 pounds per square inch. The injector material was copper. The refractory material was fireclay. As indicated, the time required for the burning off of the injector tubing increased with the thickness of the tubing. This is a critical factor contributing greatly to the practicability of the process. This factor was unforeseen until experiments were carried out.

The minimum thickness for a copper injector tube should be about three sixteenths of an inch for one-sixteenth of an inch I. D. injector. Using this wall thickness of three sixteenths of an inch, a heat was completed in sixteen minutes without any substantial burn off of the injector.

The tub projects preferably beyond the refractory inside of the vessel but it can be level with or lower than the refractory surface. This projected length is not critical to the process and is more related to the economics and practicability of renewing the injector. A practical projection is from 0" to 6" with about 1" preferred.

The refractory surrounding the tube can be the same as the refractory lining the vessel. However, for manufacturing purposes, it is convenient to leave a pocket in the refractory of the vessel and subsequently to fill this pocket by ramming it with refractory. The supporting plate within the pocket helps to draw away some of the heat.

REFRACTORY

The choice of refractory material has an influence on the life of the injector. The refractory must have a sufficiently high melting temperature or softening range and it must stand the erosion due to iron oxide. It must have high resistance to thermal shock. Since a refractory used in contact with molten iron or steel generally has high melting temperature and has high resistance to iron oxide erosion, it makes the last factor, thermal shock, a very important one. For example, an acid fireclay refractory is used in conjunction with an injector of one-sixteenth of an inch I. D. and one-eighth of an inch O. D. burns off at a rate of 0.27 inch per minute. Under similar conditions, using a basic magnesite refractory, the burn off rate of 2 inches per minute was obtained, or greater than seven times the rate when using acid fireclay. Although magnesite has a higher melting temperature and high resistance to iron oxide erosion, it is less superior to acid fireclay due to its poor thermal shock property.

The size of the injector does not have to vary with the size of the vessel. Where a greater horizontal area of metal has to be covered, then more injectors are employed.

We claim:

1. A method of treating molten metal comprising, depositing a body of such metal in a vessel having a shell provided with a refractory lining, projecting a jet of concentrated oxygen into said metal through an injector member entering the vessel through the shell and refractory lining below the surface of the metal, the injection being carried on continuously for a time and at a temperature normally destructive to the injector member, the oxygen being injected at a pressure above about 400 pounds per square inch thereby to produce localized cooling effective to maintain the integrity of the injector member at said temperature and for said time.

2. A method according to claim 1, in which the cross-sectional area of the jet is within the range from about 0.003 square inch to about 0.03 square inch.

3. A method according to claim 1, in which the jet is issued through an injector wall made of a highly heat conductive metal and in which the issuing duct has a cross-sectional area within the range from about 0.003 square inch to about .03 square inch and a wall thickness not less than about 3/16 of an inch.

4. A method of treating molten iron comprising, depositing a body of such iron in a vessel having a shell provided with a refractory lining, projecting a fine isolated jet of concentrated oxygen into said metal through an injector member entering the vessel through the shell and refractory lining below the surface of the metal, the injection being carried out continuously for at least ten minutes to produce a temperature within the range from about 2200° F. to about 3200° F. normally destructive to the injector member, the oxygen being injected at a rate fast enough to produce a localized cooling effective to maintain the integrity of the injector member at said temperature and for said time.

5. A method of treating molten metal comprising, depositing a body of such metal in a vessel having a shell providing with a refractory lining, and an injector member entering the vessel through the shell and refractory lining below the surface of the metal, projecting an inert gas through said injector member, and while said inert gas is being injected through the injector member depositing the metal in the vessel, then replacing the inert gas with a fine isolated jet of concentrated oxygen, the injection being carried out continuously for a time and at a temperature normally destructive to the injector member, the oxygen being injected at a pressure above about 400 pounds per square inch thereby to produce localized cooling effective to maintain the integrity of the injector member at said temperature and for said time.

6. A method of treating molten metal in a vessel having a metal-receiving cavity provided with a refractory lining and an injector member entering the cavity through the refractory lining below the surface of the metal and provided with a fine oxygen duct, projecting a fine isolated jet of concentrated oxygen through said injector member into said metal continuously for a time and at a temperature normally destructive to the injector member, the oxygen being injected at a pressure above about 400 pounds per square inch thereby to produce localized cooling effective to maintain the integrity of the injector member at said temperature and for said time.

7. A method of treating molten metal, comprising, depositing a body of such metal in a vessel having a shell provided with a refractory lining, then carrying out a heat continuously by projecting a fine isolated jet of concentrated oxygen into said metal below the surface thereof at a pressure above about 400 pounds per square inch thereby to produce intimate contact between the oxygen and the metal, the high pressure being effective to produce a high velocity jet providing a cooling effect at the injection zone.

8. In an apparatus for treating molten metal with concentrated oxygen, comprising, in combination, a containing vessel having a cavity for holding a molten charge, said cavity being provided with a refractory lining, an injector member projecting through the wall of said vessel and refractory lining to a point of access to the metal, said injector member being a tube and having a centrally located oxygen duct having a cross sectional area of between about .003 square inch and and .03 square inch and a wall thickness within the range from about 3/16 of an inch to about 1 inch, refractory material surrounding said injector member up to the tip thereof, and means connected to the injector member for injecting oxygen continuously at a pressure within the range from about 400 to about 1,000 pounds per square inch whereby a high velocity jet of oxygen is injected into the vessel.

9. An apparatus for treating molten metal with concentrated oxygen, comprising, in combination, a containing vessel having a refractory-lined cavity for holding a molten charge, an injector conduit leading into said cavity through the wall of the vessel and the refractory and being surrounded by refractory, said injector conduit being of a highly conductive, high melting point material and having a centrally located oxygen duct having cross-sectional area between about .003 square inch and about .01 square inch and a wall thickness within the range from about 3/16" to about 1", said injector being connected to a source of oxygen under continuous high pressure through a connection line provided with a pressure regulator and a pressure controller.

10. An apparatus according to claim 9, in which the pressure regulator is regulated at above 800 pounds per square inch and the pressure controller is set at between about 400 and about 1,000 pounds per square inch.

11. An apparatus according to claim 9, in which the injector member enters the bottom of the vessel.

12. An apparatus according to claim 9, in which injection member enters the side of the vessel below the normal level of the molten metal.

13. An apparatus according to claim 9, in which there are several injector members arranged on the bottom of the vessel in spaced apart relationship whereby each injector member is adapted to give a separate stream of gas.

14. An apparatus for treating molten metal with concentrated oxygen, comprising, in combination, a containing vessel having a shell enclosing a cavity for holding a molten charge, said cavity being provided with a refractory lining, an injector member projecting through the shell and through the refractory lining to a point of access to the metal, said injector having an oxygen duct of a size effective to form a jet of oxygen when the oxygen is injected under high pressure, the injector member being of a temperature-resistant conductive material and having a thickness effective to conduct the heat away from the site of injection within the range from about 3/16" to about 1", and means for providing oxygen to said injector under continuous high pressure thereby to produce said jet.

15. A method according to claim 1, in which the fine jet is issued through an injector wall made of a highly heat conductive metal and in which the issuing duct has a cross-sectional area within the range from about 0.003 square inch to about .03 square inch and a wall having a thickness within the range from about 3/16" to about 1".

16. In an apparatus for treating molten metal with concentrated oxygen, comprising, in combination, a containing vessel having a cavity for holding a molten charge, said cavity being provided with a refractory lining, an injector member projecting through the wall of said vessel and refractory lining to a point of access to the metal, said injector member being a tube of a highly heat-conductive metal and having a centrally located oxygen duct having a cross sectional area of between about .003 square inch and .03 square inch and a wall thickness within the range from about 3/16" of an inch to about 1 inch, refractory material surrounding said injector member up to the tip thereof, and means connected to the injector member for injecting oxygen at a pressure within the range from about 400 to about 1,000 pounds per square inch whereby a high velocity jet of oxygen is injected into the vessel.

References Cited in the file of this patent

UNITED STATES PATENTS

| | | |
|---|---|---|
| 1,479,997 | McCaffery | Jan. 8, 1924 |
| 1,662,850 | Ebner | Mar. 20, 1928 |
| 2,323,695 | Webster | July 6, 1943 |
| 2,333,654 | Lellep | Nov. 9, 1943 |
| 2,580,614 | Slottman | Jan. 1, 1952 |

FOREIGN PATENTS

| | | |
|---|---|---|
| 216,198 | Great Britain | May 20, 1924 |
| 341,915 | Great Britain | Jan. 21, 1931 |
| 493,552 | Belgium | Feb. 15, 1950 |
| 492,317 | Canada | Apr. 21, 1953 |